United States Patent [19]

Mastromoro

[11] Patent Number: 4,685,168
[45] Date of Patent: Aug. 11, 1987

[54] WINDSHIELD CLEANING SYSTEM

[76] Inventor: John F. Mastromoro, 3603 Brompton Ct., Liverpool, N.Y. 13090

[21] Appl. No.: 845,454

[22] Filed: Mar. 28, 1986

[51] Int. Cl.⁴ .............................................. B60S 1/02
[52] U.S. Cl. ................................ 15/250 R; 15/250.19
[58] Field of Search .......... 15/250 R, 250.19, 250.36; 219/203

[56] References Cited

U.S. PATENT DOCUMENTS 1,732,417 10/1929 Pritchard ........................... 15/250 R
2,974,340 3/1961 Kopczynski ................. 15/250.19 X
3,613,318 10/1971 Gianatasio ........................ 15/250 X
4,378,484 3/1983 Kunert ........................... 15/250 R X

FOREIGN PATENT DOCUMENTS 1911991 9/1970 Fed. Rep. of Germany .... 15/250 R
1512327 6/1978 United Kingdom ............. 15/250 R Primary Examiner—Peter Feldman
Attorney, Agent, or Firm—Charles S. McGuire

[57] ABSTRACT

The invention concerns a system for keeping windshield wiper blades free of ice or snow accumulation. A rectangular strip of transparent material is either affixed to or formed integrally with the windshield to extend outwardly from the surface thereof for a distance of 1/16″. The strip is about the same length as the wiper blade and one inch wide. It is positioned with the longitudinal edges parallel to and the lower edge spaced 2″ from the rest position of the wiper blade, whereby the blade wipes over both longitudinal edges of the strip in each direction on every cycle of reciprocating blade movement. The dimensions of 1/16″ in thickness, 1″ in width, and 2″ spacing from the blade have been found to provide superior results in optimum blade cleaning with minimal wear on the blade edges, and are therefore considered critical dimensions.

2 Claims, 3 Drawing Figures

WINDSHIELD CLEANING SYSTEM

BACKGROUND OF THE INVENTION

The present invention relates to vehicle windshield cleaning systems, and more specifically to means for keeping wiper blades free of ice, frozen snow and the like.

A problem commonly encountered in cold weather driving is the accumulation of ice or frozen snow on the windshield wiper blades. This occurs under conditions of precipitation when the ambient temperature is below or near freezing temperature. Use of the defroster, while keeping the inside of the windshield free of frost and condensation, may worsen the condition on the outside by tending to melt snow which quickly accumulates as "slush" on the wipers and then freezes on the wiper arms and blades due to the colder outside temperature and wind chill.

Attempts to alleviate this problem have included supplying heat by electric or other means to the wiper blades and/or arms. Beside the added cost imposed by such systems, they are subject to failure and require maintenance and repair. Special winter blades of "nonstick" material are also available, but are more costly than conventional blades and may still experience a certain amount of freezing or slush build-up under some conditions. Other systems directed to the same purpose include those disclosed in U.S. Pat. Nos. 3,908,222, wherein a plurality of relatively small, independent elements are adhered to the windshield in spaced relation to one another, 2,974,340, comprising strips with a plurality of raised ribs arranged at acute angle to the direction of travel of the blades, and 4,378,484, employing strips of material arranged in the form of an inverted V above the rest positions of the blades. While some of such systems provide effective means for keeping the blades free from ice or snow, they require special fabrication, thus involving tooling and/or assembly costs, and in some cases exert undue wearing forces on the blade edges.

It is a principal object of the present invention to provide a simple and inexpensive, yet thoroughly effective means for keeping conventional windshield wiper blades free of ice, snow, etc.

Another object is to provide means for preventing build-up of frozen or semi-frozen material on windshield wiper blades which requires no modification of or attachments to the wiper blades or arms.

A further object is to provide an inexpensive means for use with an existing windshield cleaning system to keep the movable wiper members essentially free of ice, snow, and the like, which may be fabricated from standard materials and installed in a very quick and easy manner by the vehicle owner or operator.

Still another object is to provide stationary wiper blade cleaning means which keep the blades free of frozen material yet produce substantially no additional wear on the blade edges.

Other objects will in part be obvious and will in part appear hereinafter.

SUMMARY OF THE INVENTION

In accordance with the foregoing objects, the invention contemplates a wiper blade cleaning system comprising a rectangular strip of transparent material having a length about the same as that of the blades, e.g., 12", a width of one inch, and a thickness of 1/16". The strip is affixed to the outer surface of the windshield, for example, by transparent, double-sided, adhesive tape of a type which bonds well to glass and smooth plastic surfaces, in a position with the longitudinal edges parallel to and with the lower edge spaced a distance of 2", from the rest position of the blade. Thus, during normal operation of the windshield wipers the blade edges pass over the strip in both directions with each reciprocating motion of the arms. The movement of the blades over the longitudinal edges of the strip wipes any precipatation, including that in a frozen or semi-frozen state, from the edges of the blades, keeping them clean and effective.

DETAILED DESCRIPTION

Figure 1:
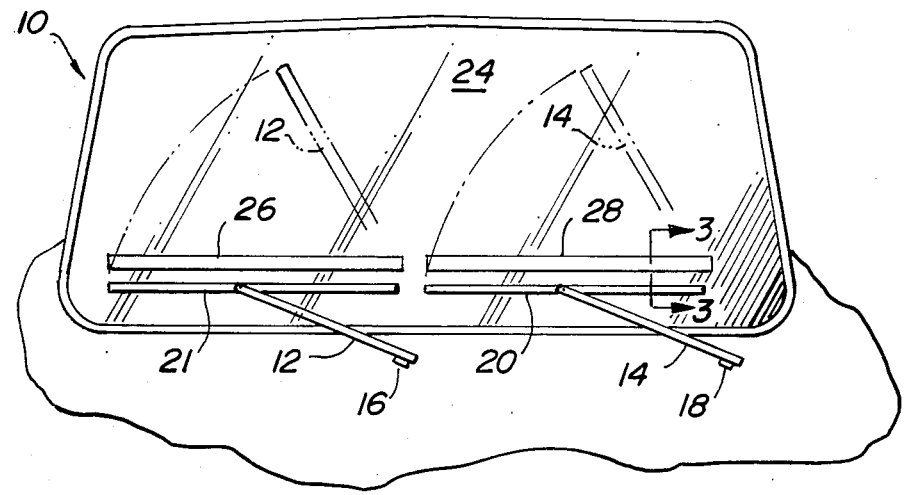
FIG. 1 is a front elevational view of a vehicle windshield, showing the wiper blades and the cleaning members of the invention.

Referring now to the drawings, in FIG. 1 is shown a conventional vehicle windshield 10 with wiper arms 12 and 14 mounted for pivotal movement about mountings at 16 and 18, respectively. Wiper arms 12 and 14 carry replaceable blades 20 and 21, respectively, in known manner. Conventional wiper blades such as blades 20 and 21 are constructed of flexible rubber or plastic and held by a metal frame which is mounted on the corresponding wiper arm. Arms 12 and 14 are reciprocatingly moved between an initial or rest postion, shown in solid lines in FIG. 1, and a terminal position, shown in dotted lines, by power drive means such as an electric motor and transmission mechanism (not shown). As the arms are moved, an elongated edge of each blade, such as edge 22 (FIG. 3) of blade 20, is maintained in wiping contact with outer surface 24 of windshield 10.

The arrangement described above is intended to be a generic description of a conventional vehicle windshield cleaning system. Various systems may, of course, have various configurations other than that shown. For example, the two arms may be mounted for reciprocating, pivotal movement in opposite directions about axes at adjacent or opposite ends of the arms, or the cleaning system may include only a single arm and blade, which is common for wiper systems for the rear windows of some present-day automobiles, or the pivot points may be adjacent the upper side of the windshield or window rather than the lower side, as shown. In any event, the present invention is suitable for incorporation with any vehicle window or windshield cleaning system which utilizes one or more reciprocating wiper blades, and is not limited to the particular arrangement shown, which is for illustrative purposes only.

The wiper blade cleaning system of the invention comprises an elongated strip of material extending outwardly from the outer surface of the windshield and positioned thereon for wiping contact by the blade in each direction on every complete reciprocation of the wiper arm. The strip may comprise a separate piece of material affixed to the windshield or may be an integral part thereof. The strips shown in FIG. 1 are denoted by reference numerals 26 and 28, and are positioned with their longitudinal edges substantially parallel to the initial or rest position wiper blades 20 and 21, respectively.

Figure 2:
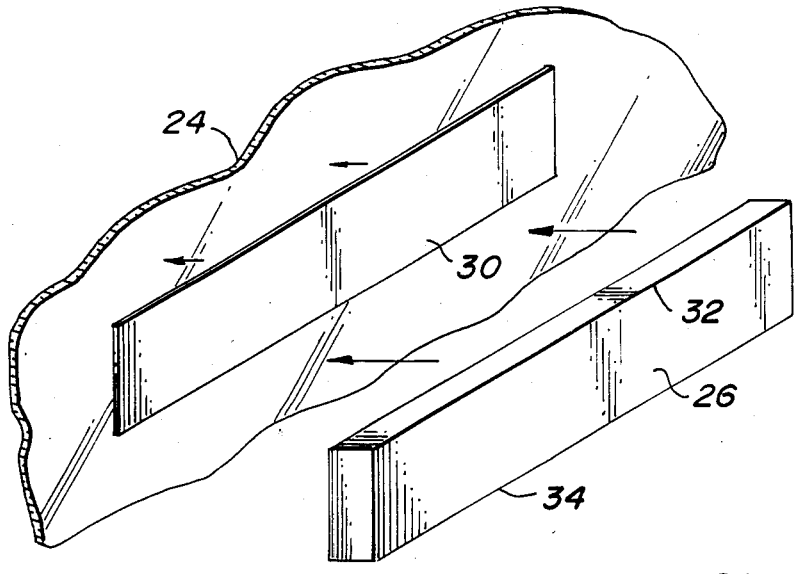
FIG. 2 is an exploded, perspective view of the cleaning members and a fragment of the windshield.
Figure 3:
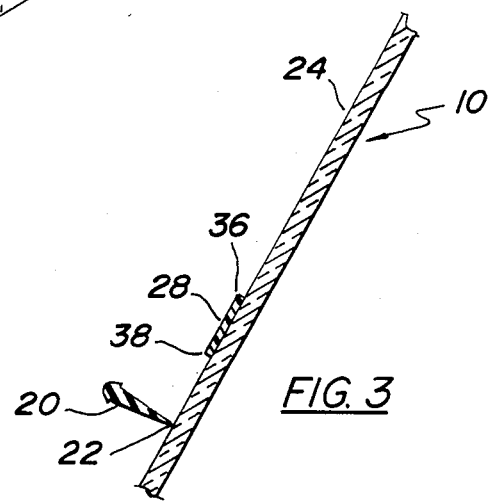
FIG. 3 is a side elevational view in section on the line 3—3 of FIG. 1.

In FIG. 2, strip 26 is shown as a separate, rectangular piece of material having a length of about 12", a width of 1", and a thickness of 1/16". Strip 26 is affixed to outer surface 24 of windshield 10 by means of double-sided adhesive strip 30. Longitudinal edges 32 and 34 of strip 26 are "sharp" edges, i.e., they form abrupt, 90° angles between adjoining surfaces of the strip. In FIG. 3 strip 28, having longitudinal edges 36 and 38, is shown as an integral part of windshield 10, extending outwardly from surface 24 thereof in the same position with respect to wiper blade 20.

In operation, as wiper arms 12 and 14 move in their normal, reciprocating motion, edge 22 of blade 20 passes over strip 28, and the corresponding edge of the other blade 21 passes over strip 26, in both upward and downward directions with each reciprocation of arms 12 and 14. As blade 20 moves upwardly edge 22 thereof is wiped over and consequently cleaned by (i.e., any material such as frozen, semi-frozen or crystallized precipitation is essentially removed) edge 38 of strip 28. The same action takes place as blade 20 moves downwardly, wiping edge 22 of the blade over edge 36 of strip 28.

It is preferred, of course, that strips 26 and 28, as well as the double-sided adhesive strips, when used, are transparent so as not to interfere in any way with vision through the windshield. The length of the strips should be at least as long as, but need not be significantly longer than, the wiper blades with which they are used. The width and thickness of the strips is substantially exactly one inch and 1/16", respectively. The position for strips 26 and 28 is substantially exactly 2" above the rest position of the blades, i.e., with the lower edge of the strip 2" above and parallel to the edge of the wiper blade. This distance from the wiper blades insures that heat from the defroster will keep the strips clear of frozen precipitation.

Thus, it may be seen from the foregoing that the objects and advantages of the invention are efficiently attained by very inexpensive structure which may be incorporated directly into the windshield at the time of manufacture or, alternatively, may comprise separate elements affixed to the windshield in a very simple and rapid operation. The structure may be incorporated in any windshield cleaning system which utilizes reciprocating wiper blades, with any type of vehicle including aircraft and locomotives, as well as trucks and automobiles. The transparent plastic strips have been found to operate effectively and remain firmly attached to the windshield under all temperatures and weather conditions when secured with a suitable, conventional, double-sized, adhesive strip. It has been found that a strip thickness of substantially exactly 1/16" allows the blades to easily bend in either upward or downward direction when in motion without damage to the blade ends, or wiping surfaces, and also allows the blades to travel smoothly over the strip without a "jerking" motion. Also, the 1" width is critical in providing optimum blade wiping action with minimal accumulation of material wiped from the blades and little or no wear on the blade wiping surfaces. Although it is anticipated that the invention will be principally employed on the front windows of vehicles, it is equally effective on rear or other window, and the term "windshield" is intended to apply to any vehicle window which is equipped with reciprocating wipers.

What is claimed is:

1. In a vehicle windshield cleaning system wherein an elongated wiper blade is mounted for reciprocating movement between predetermined initial and terminal positions by power driven means with a longitudinal edge of said blade in contact with the outer windshield surface, the improvement comprising a first strip of transparent, smooth non-abrasive surfaced material adhesively secured to and extending forwardly from said outer windshield surface, said first strip having a pair of parallel, sharp, longitudinal edges having length at least substantially equal to that of said wiper blade, a width of substantially exactly one inch, and a thickness in the direction of extension from said outer windshield surface of substantially exactly 1/16", said first strip being positioned with said longitudinal edges substantially parallel to said wiper blade in said initial position thereof and the longitudinal edge thereof nearest said blade positioned substantially exactly two inches from said initial position for contact with both of said longitudinal edges by said blade over substantially the full length thereof in both directions of motion on each cycle of reciprocating movement of said blade, said first strip having a constant, uniform, rectangularly shaped cross-sectional shape throughout its length such that the longitudinal, sharp edges of said first strip form abrupt 90° angles between adjoining surfaces of said first strip.

2. The invention according to claim 1 wherein said first strip is adhesively secured to said windshield surface by a second strip of transparent, double-sided adhesive material of substantially the same size as said first strip for permanently securing the latter to said windshield surface.

* * * * *